United States Patent [19]

Dell'Acqua et al.

[11] Patent Number: 4,732,044

[45] Date of Patent: Mar. 22, 1988

[54] PRESSURE MEASURING DEVICE

[75] Inventors: Roberto Dell'Acqua, Pavia; Giuseppe Dell'Orto, Milan; Giuseppina Rossi, Pavia; Gilberto Dendi, Milan, all of Italy

[73] Assignee: Marelli Autronica S.p.A., Pavia, Italy

[21] Appl. No.: 908,480

[22] Filed: Sep. 17, 1986

[30] Foreign Application Priority Data

Sep. 17, 1985 [IT] Italy ............................. 53805/85[U]

[51] Int. Cl.<sup>4</sup> ........................... G01L 7/08; G01L 9/06
[52] U.S. Cl. ........................................ 73/727; 73/721; 338/4
[58] Field of Search ............... 73/727, 721, 726, 720, 73/708, 711, 4 R; 338/4, 42

[56] References Cited

U.S. PATENT DOCUMENTS

| 3,034,347 | 5/1962 | Starr | 73/862.63 |
| 3,646,815 | 3/1972 | Martin et al. | 73/727 |
| 4,480,478 | 11/1984 | Sato et al. | 73/727 |
| 4,576,052 | 3/1986 | Sugiyama | 73/727 |
| 4,620,449 | 11/1986 | Borries | 73/862.21 |

Primary Examiner—Donald O. Woodiel
Attorney, Agent, or Firm—Sughrue, Mion, Zinn, Macpeak, and Seas

[57] ABSTRACT

A pressure measuring device comprises a support casing having an aperture, a substrate mounted in the casing and deformable through the effect of a pressure to be measured introduced into the casing through the aperture, at least one electrical deformation sensor, preferably a thick-film resistor, applied to the substrate, circuit means housed in the casing and connected to the at least one electrical deformation sensor for outputting electrical signals indicative, according to a predetermined response curve, of the deformations of the substrate and hence of the pressure acting thereon, and manually-operable electrical adjustment means mounted in the casing and connected to the circuit means, for modifying predetermined characteristics of the response curve.

7 Claims, 8 Drawing Figures

PRESSURE MEASURING DEVICE

The present invention relates to a pressure measuring device and particularly to a device of the type comprising a support casing having an aperture, a substrate mounted in the casing and deformable through the effect of a pressure introduced into the casing through the aperture, at least one electrical deformation sensor, preferably a thick-film resistor, applied to the substrate, and circuit means housed in the casing and connected to the at least one electrical deformation sensor for outputting electrical signals indicative, according to a predetermined response curve, of the deformations of the substrate and hence of the pressure acting thereon.

Pressure gauges of this type are used, for example, in motor vehicles, particularly in electronic injection systems, electronic ignition systems, fuel consumption meters, etc.

In such applications, the pressure measuring device is generally connected to an electronic control and operating unit (central control). The pressure measuring device, which in this application is usually intended to measure the pressure or vacuum in the induction manifold, is mounted on the engine in a readily accessible position, while the electronic control and operating unit, on the other hand, is often mounted in a position which is accessible with difficulty.

What is particularly important with regard to the good operation of the aforesaid systems or devices is their adjustment during the initial setting up or subsequently.

The pressure measuring devices made up to now do not allow their characteristics to be modified and the adjustments are therefore effected by means of the electronic control unit which, as stated above, is usually mounted in a position which is accessible with difficulty.

The object of the present invention is to provide a pressure measuring device of the type specified above, which enables the adjustment of the systems or devices of which they form a part to be simplified.

This object is achieved according to the invention by means of a pressure measuring device of the type specified at the beginning, the main characteristic of which lies in the fact that it further includes manually-operable adjustment means accessible from the exterior of the casing and connected to the circuit means, for modifying the predetermined characteristics of the response curve.

According to a further characteristic, the adjustment means may include first means for causing a constant-magnitude increase or a decrease in the intensity of the signal output by the circuit means.

According to a further aspect, the adjustment means may include second means for multiplying the intensity of the signal output by the circuit means by a constant factor.

The sensor according to the present invention, when used for detecting the pressure in the induction manifold of an engine, for example, enables the engine to be tuned easily, particularly with regard to the carburation, the adjustment of the idling speed, and the exhaust gases.

Further characteristics and advantages of the device of the invention will become apparent from the detailed description which follows with reference to the appended drawings, provided purely by way of non-limiting example, in which.

Figure 8:
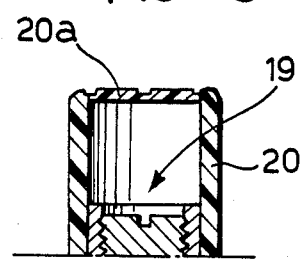
Figure 4:
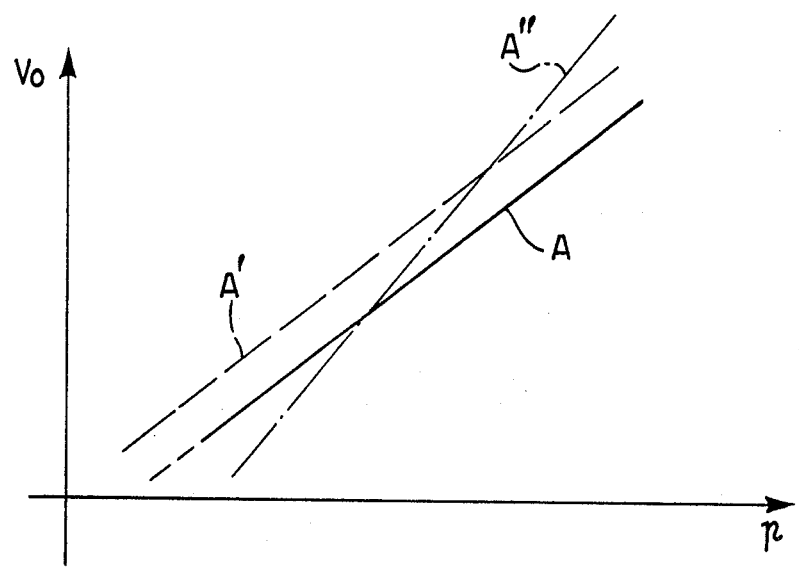
Figure 7:
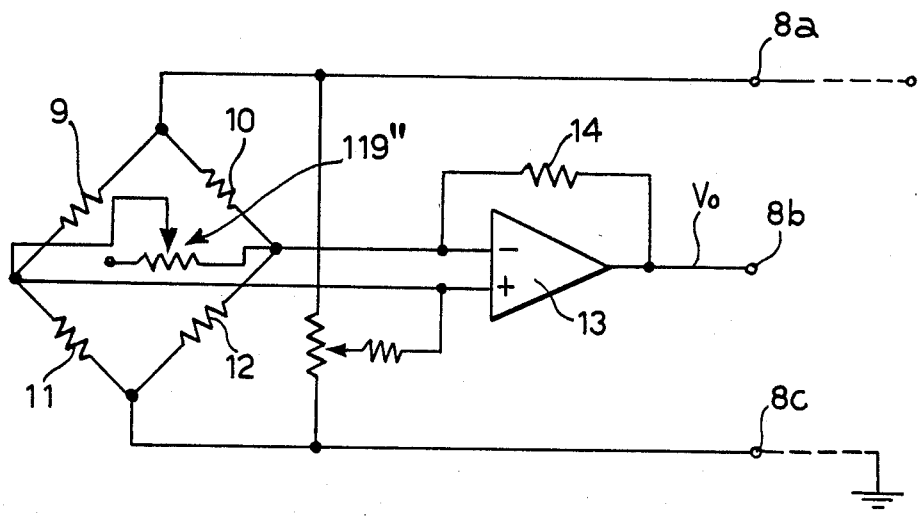
Figure 5:
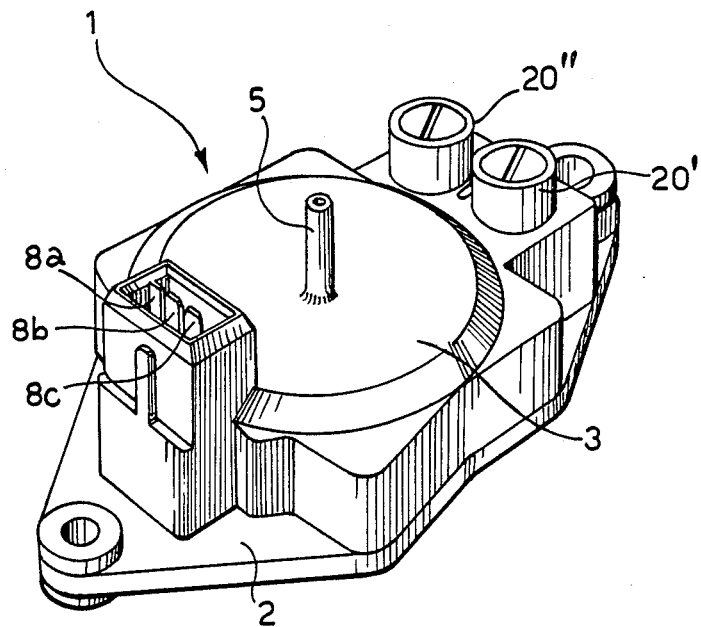
Figure 6:
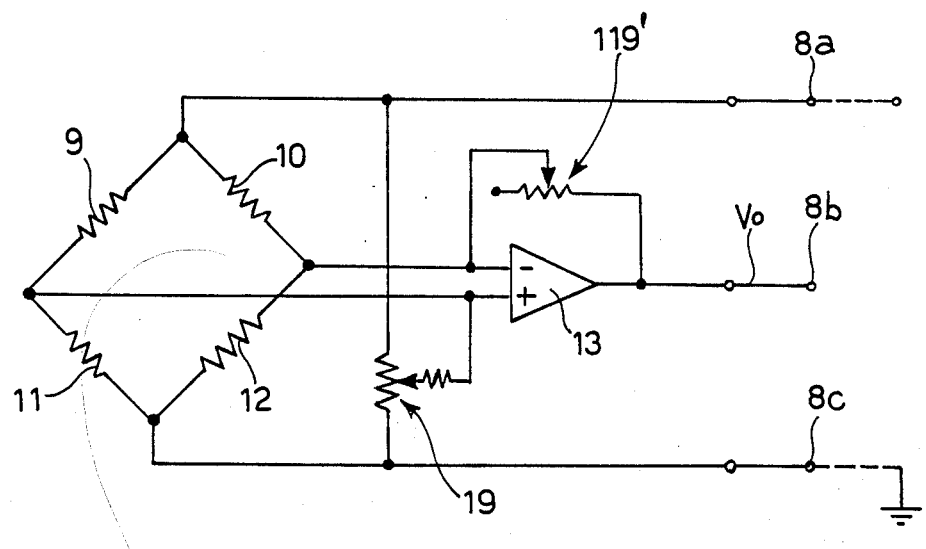

FIG. 4 is a graph showing the changes in the voltage output by the device according to the invention as a function of the pressure measured, FIG. 5 is a perspective view of another device according to the invention, FIG. 6 is an electric circuit diagram of the sensor shown in FIG. 5, FIG. 7 is a further possible electrical circuit diagram of the device shown in FIG. 6, and FIG. 8 is a sectional view showing a detail of the device according to the invention.

Figure 1:
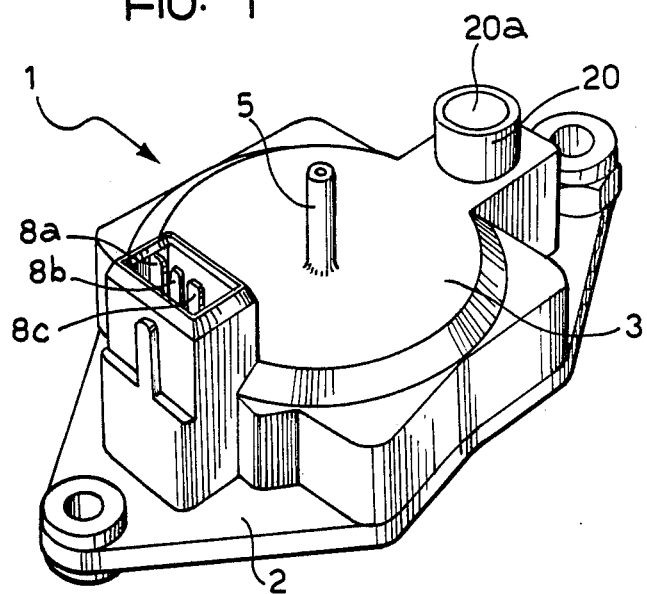
FIG. 1 is a perspective view of a device according to the invention.
Figure 2:
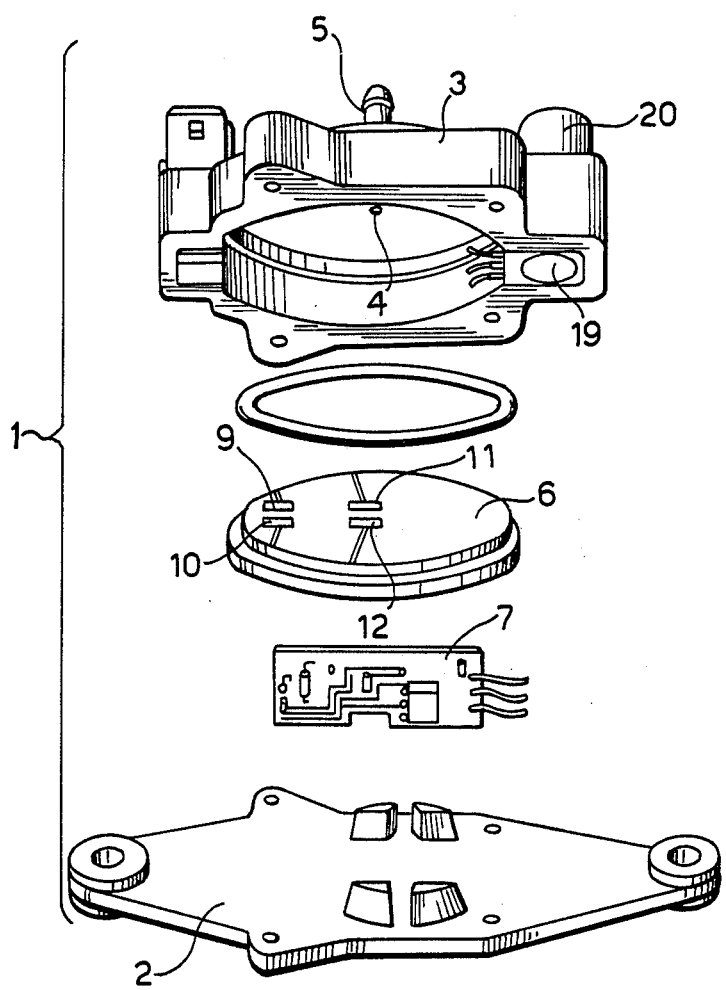
FIG. 2 is an exploded perspective view of the device shown in FIG. 1.

With reference to FIGS. 1 and 2, a pressure measuring device 1 according to the invention includes a support casing formed by a lower base 2 to which a hollow body 3 is fixed by screws and/or glue. This body and the base are both made, for example, from a plastics material.

Between the body 3 and the base 2 is a chamber which can communicate with the exterior through an aperture, indicated 4 in FIG. 2, and an external connector, indicated 5.

A substantially circular substrate 6, for example of ceramics material, is disposed within the chamber facing the aperture 4. Thick-film resistors have been deposited on the substrate 6 in known manner; two first resistors have been deposited adjacent the edge of the substrate and another two resistors close to its centre. These resistors are connected by conductive tracks to a processing circuit supported by a printed circuit board 7 located beneath the substrate 6.

Within the body 3 is an electrical connector with three contact blades 8a, 8b and 8c accessible from the exterior and connected to the circuit carried by the board 7. More particularly, the terminals 8a and 8c are intended for connection to a dc voltage supply and to earth respectively, while the termianl 8b represents the output for the signal generated during operation of the measuring device.

Figure 3:
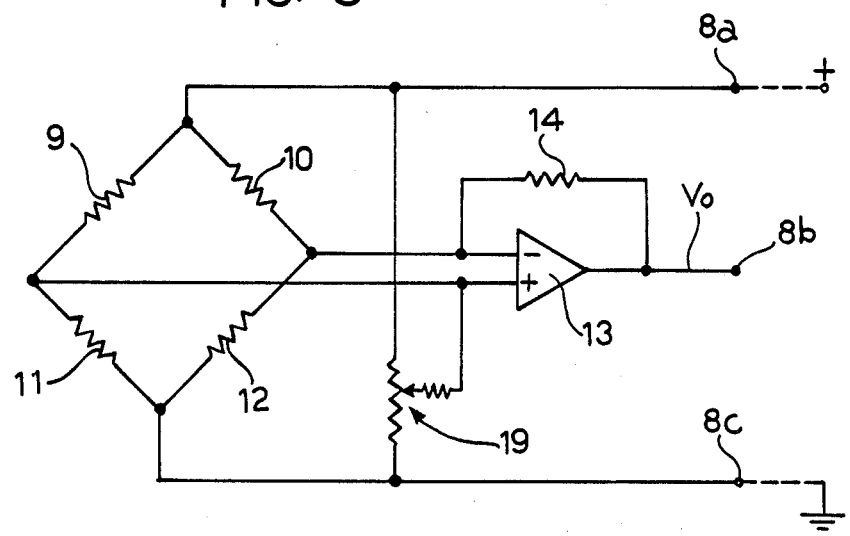
FIG. 3 is an electrical circuit diagram of the sensor shown in FIGS. 1 and 2.

With reference to FIG. 3, the thick-film resistors 9 and 12 deposited on the substrate 6 are connected together as a bridge and the vertices of a first diagonal of the bridge are connected to the terminals 8a, 8c, while the vertices of the other diagonal are connected to a differential amplifier 13 provided with a feedback resistor 14.

In use, the pressure to be measured is fed to the chamber in which the deformable substrate 6 is mounted through the connector 5 and the aperture 4; the deformation of the substrate causes a corresponding deformation of the resistors 9-12 and unbalancing of the bridge formed thereby. The signal $V_O$ output by the amplifier 13 is thus a univocal function of the deformation undergone by the thick-film resistors 9-12, which act as piezoresistive transducers, and hence of the pressure measured. The response curve of the device is illustrated by way of example in FIG. 4: the output voltage $V_O$ is a practically linear function of the pressure p, as indicated by the solid straight line A in FIG. 4.

In the device of FIGS. 1 and 2, a potentiometer with an adjusting screw (trimmer) is also mounted in a cylindrical space 20 in the body 3. This potentiometer is indicated 19 in FIG. 3: its resistive element is connected between the terminals 8a and 8c, while its slider is connected to an input of the amplifier 13. The offset voltage fed into the amplifier is varied by means of this trimmer and the response curve of the entire device is thus moved in the plane $V_O,p$, as indicated, for example, by the dashed straight line A'. The potentiometer 19 thus enables the zero point of the measuring device to be adjusted, that is, the calibration of the device so that the signal $V_O$ assumes the value zero at a predetermined value of the pressure measured.

The cylindrical space 20 in which the trimmer 19 is housed has an upper breakable cover constituted, for example, by a cover 20a of plastics material in which preferential breakage lines are made by suitable reductions in its thickness. The potentiometer 19 may be adjusted by the manufacturer and then sealed. For any subsequent recalibration of the potentiometer, access can then be made to the potentiometer 19 after breakage of the breakable cover 20a. The space 20 may be closed by means of a removable stopper after these subsequent adjustments.

In order to allow the maximum flexibility of adjustment of the response curve of the measuring device, however, it is desirable not only to enable the response curve to be moved but only to enable the sensitivity of the device to be modified, that is, to enable the magnitude of the signal output by the device to be multiplied by a constant factor (greater or less than 1). This corresponds, in the graph of FIG. 4, to effecting rotations of the response curve to enable it to change, for example, from the straight line A to the straight line A" illustrated by a chain line. In order to enable the sensitivity of the device to be varied, a further adjusting potentiometer is provided according to the invention, as shown in FIG. 6 or in FIG. 7.

In FIG. 6 a potentiometer 119' allows the gain of the amplifier 13 to be varied, while in FIG. 7 a potentiometer 119" connected between the inputs of the amplifier 13 allows a similar effect to be achieved.

In the version having the greatest flexibility of adjustment, as shown in FIG. 5, the pressure measuring device of the invention has two spaces 20', 20" in which the two adjustment trimmers 19 and 119' or 119", respectively, are housed.

Although it has not been specifically illustrated, a pressure measuring device provided with a single trimmer for adjusting the sensitivity alone also fails within the scope of the present invention.

The pressure measuring device according to the invention, by virtue of the adjusting device or devices incorporated therein, may be set up very quickly and precisely. Moreover, when it is used in systems for controlling the operation of an internal combustion engine, it enables the engine to be tuned up quickly without the need for adjustment or compensation of the electronic control unit of these systems.

Naturally, the invention extends to all embodiments which achieve equal utility by virtue of the same innovative concept.

We claim:

1. A pressure measuring device comprising
   a support casing having an aperture,
   a substrate mounted in the casing and deformable through the effect of a pressure to be measured introduced into the casing through the aperture,
   at least one electrical deformation sensor, comprised of a thick-film resistor, applied to the substrate,
   circuit means housed in the casing and connected to the at least one electrical deformation sensor for outputting electrical signals indicative, according to a predetermined response curve, of the deformations of the substrate and hence of the pressure acting thereon, and
   manually-operable electrical adjustment means mounted in the casing and connected to the circuit means, for modifying predetermined characteristics of the response curve;
   said adjustment means including first means for causing a constant-magnitude increase or decrease in the intensity of the signal output by the circuit means and
   second means for multiplying the intensity of the signal output by the circuit means by a constant factor wherein said casing is provided with the access means to enable adjustment of said first and second means from the exterior of said casing.

2. The device according to claim 1 in which the circuit means include an amplifier, and the adjustment means comprise a potentiometer for modifying the gain of the amplifier.

3. The device according to claim 1, in which a plurality of thick-film resistors are inserted in a bridge circuit, and the second means comprises a potentiometer connected to the bridge circuit.

4. The device according to claim 1, in which the circuit means comprise a differential amplifier, and the adjustment means comprise an first generator circuit for applying an offset voltage to an input of the differential amplifier.

5. The device according to claim 1, wherein the first and second means are mounted in respective housings provided with respective removable closure members.

6. The device according to claim 5, wherein the closure member for each housing is breakable to allow access to the adjustment means.

7. The device according to claim 6, wherein each housing can receive and retain a removable stopper after the breakage of the breakable closure member.

* * * * *